United States Patent Office 3,016,043
Patented Jan. 9, 1962

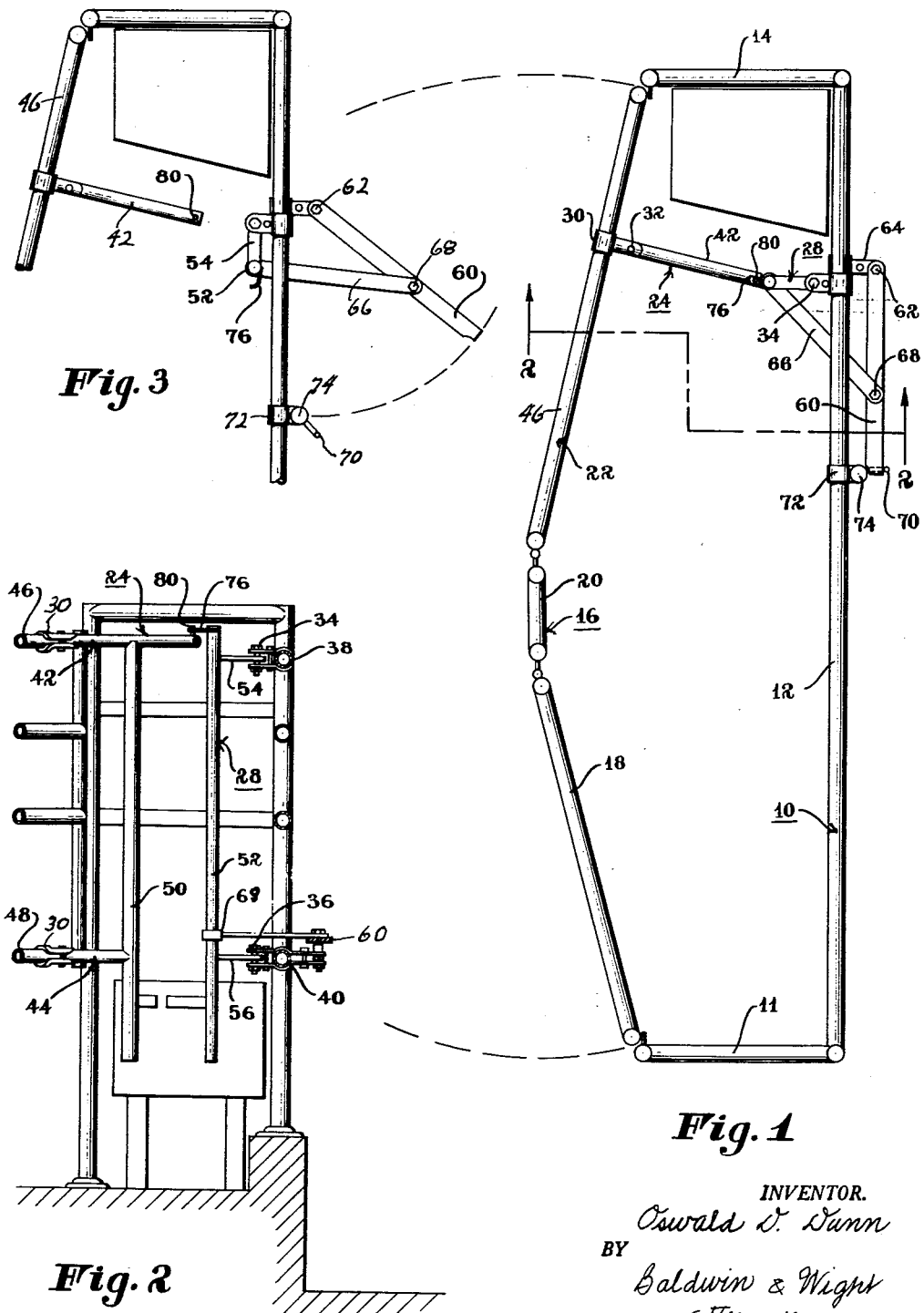

3,016,043
HEADSTOCK FOR MILKING PARLOR STALL
Oswald D. Dunn, Rte. 1, Box 94, New Bern, N.C.
Filed May 16, 1960, Ser. No. 29,351
7 Claims. (Cl. 119—27)

This invention relates to headstocks and more particularly to a headstock for a milking parlor stall.

Previously, numerous types of cow parlor stalls have been employed for confining cows while being milked. Certain of these prior art type devices include no headstock structure for maintaining the head of the cow in one position. Others provide headstock structure which retains the cow's head in a relatively fixed position, but this latter structure is integral with the milking parlor. For example, the headstock may be formed integrally with the exit gate or with a rigid portion of the headstock secured to the exit gate while another rigid portion is secured to the stationary side wall. If the headstock is formed in part integrally with the gate and in part integrally with the stall frame or structure, it is necessary that the head of the cow be inserted into the headstock as the gate is being closed. There is thus the possibility that the cow may pass through the gate rather than insert its head in the yoke, or that the cow may be injured by the hearstock as the gate closes. In the instance of the yoke which is formed with portions integral respectively with the exit gate and the opposed fixed side wall, it is necessary that the exit gate be open when the cow enters the stall from the opposite end through the entrance gate. It is thus possible for the cow to proceed through the exit gate. Even if the cow stops in the proper position, it is necessary that the exit gate be closed against the cow's neck whether the cow's head is or is not in the correct final position.

Accordingly, it is an object of this invention to provide an improved headstock for a milking parlor.

It is another object of this invention to provide a headstock for a milking parlor which is adjustable and which is not moved to its securing position until after the cow is in the proper position.

It is another object of this invention to provide a headstock which can be opened and closed to engage and release the cow, respectively, while the exit gate remains stationary.

It is another object of this invention to provide an improved headstock which may be employed in combination with milking parlors presently in use.

Briefly, in accordance with certain aspects of this invention, a headstock is provided which may be installed on various forms of milking parlor stalls. For example, these headstocks may be employed on milking parlor stalls of the type disclosed in Ferris Patents 2,688,309 and 2,904,002. Stalls of this type are defined by rigid enclosures, preferably made of pipe in which substantially rectangular enclosures are defined on three sides by stationary members. The fourth side is defined by a pair of gates usually pivoted centrally of the fourth side. At one end of the stall is a feed bin. The gate more remote from the feed bin is utilized as the entrance gate. The gate adjacent the feed bin is the exit gate. I have discovered that improved headstock structure can be formed by securing a portion of the headstock to one side of the parlor and pivotally mounting a co-operating portion of the headstock on the opposite side of the parlor. The portion which is secured to one side of the parlor may, advantageously, be secured to the exit gate, while the pivoted portion of the headstock is mounted on the rigid wall of the parlor. Also, advantageously, these headstock portions may be secured, as by clamps, to the respective walls of existing parlors, and may be adjusted vertically of the stall.

In accordance with other aspects of this invention, the pivotally mounted portion of the headstock is manually movable by means of a lever mechanism which is secured to one of the side walls of the parlor and connected by a linkage to the pivotally mounted portion of the headstock.

These and various other objects and features of the invention will be more clearly understood from a reading of the detailed description of the invention in conjunction with the drawing, in which:

FIGURE 1 is a plan view of a milking parlor showing one illustrative embodiment of the headstock in accordance with this invention;

FIGURE 2 is a view in vertical section taken along the lines 2—2 of FIGURE 1, some parts being shown in elevation; and FIGURE 3 is a partial plan view of the milking parlor of FIGURE 1 showing the headstock in a position to permit entry or exit of the cow's head.

Referring to FIGURE 1, there is depicted a milking parlor 10 having an animal receiving space defined by a rigid end wall 11, a rigid side wall 12, a side wall 16 and another rigid end wall 14. The side wall 16 opposite the side wall 12 is defined by an entrance gate 18 pivotally mounted on a rigid portion 20 and an exit gate part 22 also pivotally mounted about the rigid portion 20. The headstock, according to this invention, is defined by two main portions 24 and 28. The portion 24 is secured to the exit gate 22 by means of clamps, such as 30, which are adjustable by means of bolts, such as 32. The portion 28 of the headstock is pivotally mounted with respect to pivot pins 34 and 36. Advantageously, these pivot pins 34 and 36 retain a pair of adjustable clamps in engagement with the pipes 38 and 40 respectively of side wall 12. It is, therefore, possible to adjust the position of the pivotally mounted portion 28 of the headstock relative to the side wall 12 to the desired position.

As best seen in FIGURE 2, the portion 24 of the headstock includes a first member 42 and a second member 44 clamped, respectively, to pipes 46 and 48 of the exit gate 22. An upright member 50 is connected, as by welding, between the members 42 and 44 to define a portion of the neck yoke. The other portion of the neck yoke is defined by an upright bar 52 on the opening part 28 of the headstock. This upright bar 52 is secured to a pair of arms 54 and 56 which are pivoted about pins 34 and 36, respectively. The movement of the opening part of the headstock is manually controlled by means of a lever 60 which pivots about a pin 62. Pin 62 is held in spaced relation with respect to the side wall 12 by means of member 64 which also may be clamped to a pipe of the side wall 12. The lever 60 is connected to the opening part 28 of the headstock by means of a link 66 which is connected by pin 68 to the lever 60. The link 66 has a sleeve 69 on its other end, which sleeve slidably encircles the upright member 52 of the opening part 28 of the headstock.

Advantageously, a latch 70 is pivotally mounted on the side wall 12 by means of a clamp 72 which is secured in position by means of a bolt 74. This pivot latch 70 pivots about a horizontal axis to engage the end of lever 60 when the opening portion 28 of the headstock is in its closed position. Also, advantageously, a latch 76 is provided on the upper end of member 52 to engage a pin 80 on the stationary part 42 of the headstock.

Referring now to FIGURE 3, there is depicted a partial plan view of the milking parlor of FIGURE 1 showing the headstock in its open position. As herein depicted, the lever 60 has been rotated away from the side wall 12 causing the members 54 and 56 to pivot about their pins 34 and 36, respecitvely. The upright member 52 is thus in a position adjacent the side wall 12 permitting the cow's head to enter or leave the yoke defined by members 50 and 52. If the entrance gate 18 is opened and the cow enters the milking parlor, there is no possibility of the cow's leaving through the exit gate since the exit gate is closed and preferably secured in its closed position by a convenient latch (not shown). The cow now moves to a feeding position with its head above the feedbox and the lever 60 is moved toward the side wall 12. Movement of lever 60 brings the upright portion 52 of the neck yoke into co-operation with the upright portion 50 to retain the head of the cow in a position thus above the feedbox. As the lever 60 reaches a point in which it is engaged by latch 70, the latch 76 engages pin 80 to prevent the cow from opening the headstock by swinging the exit gate 22 open.

While I have shown and described one illustrative embodiment of this invention, it is understood that the concepts thereof may be applied to various other embodiments without departing from the spirit and scope of this invention, as defined by the claims.

I claim:

1. In a milking parlor structure defining an animal receiving space, two spaced side walls one of which comprises a gate section mounted to move from a closed position outwardly away from said space to an open position to permit passage of an animal; a first headstock portion supported on a part of said gate section; and a second headstock portion supported on a part of the other of said side walls, one of said headstock portions being fixed to the part on which it is supported, and the other of said headstock portions being mounted on and for movement relative to the part on which it is supported and relative to said one of said headstock portions when said gate is in closed position.

2. A milking parlor structure according to claim 1 comprising means for moving said other of said headstock portions, said means including a lever pivotally mounted on the part on which said other of said headstock portions is supported, and a link connecting said lever and said other of said headstock portions.

3. A milking parlor structure according to claim 1, further comprising latch means for securing said other of said headstock portions to said one of said headstock portions when said one of said headstock portions has been moved to a predetermined position.

4. A milking parlor structure according to claim 1 further comprising latch means for securing said other of said headstock portions in operative position relative to said one of said headstock portions.

5. In a milking parlor defined by a pair of side walls and a pair of end walls, one of said side walls including a gate, a headstock comprising a first portion secured to said gate and a second portion movably mounted on the other of said side walls, and means for moving said second portion into a position of co-operation with said first portion when said gate is closed.

6. A milking parlor structure according to claim 5, wherein said second portion of said headstock is defined by an upright member pivotally connected to said other side wall and wherein said means for moving said second portion comprises a lever and a linkage connecting said lever and said second portion, said lever being pivotally connected to said other side wall.

7. A milking parlor structure according to claim 6, including adjustable clamps for securing said first portion of said headstock to said gate, and adjustable clamps for connecting said second portion of said headstock to said other side wall of said milking parlor, whereby the position of said headstock may be adjusted relatively to said side walls.

References Cited in the file of this patent

UNITED STATES PATENTS

| | | |
|---|---|---|
| 1,243,838 | Higbee | Oct. 23, 1917 |
| 2,099,956 | Flatley | Nov. 23, 1927 |
| 2,198,048 | Babson et al. | Apr. 23, 1940 |
| 2,454,300 | Babson | Nov. 23, 1948 |
| 2,536,236 | Thomas | June 2, 1951 |

FOREIGN PATENTS

| | | |
|---|---|---|
| 111,707 | Australia | Oct. 8, 1940 |